Sept. 17, 1940.      A. F. REHNBERG      2,215,134

MEANS FOR ASSEMBLING ROLLER BEARINGS

Filed May 24, 1937

Inventor:
Axel F. Rehnberg
By Wilson, Dowell, McCanna & Wintercorn
Attys.

Patented Sept. 17, 1940

2,215,134

UNITED STATES PATENT OFFICE 2,215,134

MEANS FOR ASSEMBLING ROLLER BEARINGS

Axel F. Rehnberg, Rockford, Ill., assignor to Rehnberg-Jacobson Mfg. Co., Inc., Rockford, Ill., a corporation of Illinois Application May 24, 1937, Serial No. 144,422

2 Claims. (Cl. 206—46)

This invention relates to a new and improved means for assembling roller or needle bearings.

Roller bearings are now quite commonly assembled so that the rollers are "keystoned" in place, and therefore do not require a retainer ring to prevent displacement prior to the insertion of the cooperating axle member. However, I have found that one cannot in quantity production rely implicitly upon the keystoning of the rollers, because the slightest variation in the size of the bore or of the rollers will either prevent keystoning the rollers or the rollers will be keystoned so insecurely that slight jarring of the bearing will suffice to cause the rollers to drop out. Then too, even where the parts are produced to close limits and the rollers will keystone properly, it slows up production too much if the workman has to exercie so much care in the handling of the bearings to prevent displacement of the rollers. It is therefore the principal object of my invention to provide an improved means for assembling roller bearings in which the rollers are securely held in place by a temporary retainer until the final assembling operation when the temporary retainer is arranged to be ejected.

The invention is illustrated in the accompanying drawing, in which—

The same reference numerals are applied to corresponding parts throughout the views.

Figure 1:
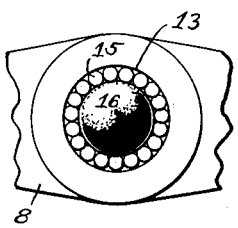
Figures 1 and 2 are, respectively, a side view and a cross-section of a bearing showing rollers retained therein temporarily in accordance with the present invention.
Figure 2:
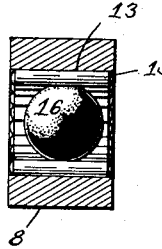
Figure 3:
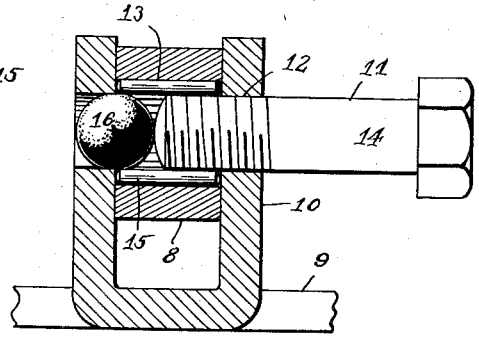
Fig. 3 is a sectional detail of an assembly of which the bearing of Figs. 1 and 2 forms a part, showing how the temporary retainer is ejected in the final assembling operation.

Referring first to Figs. 1 to 3, the part illustrated at 8 is a clutch release lever which is arranged to be mounted on a plate 9 between the ears 10, as by means of a bolt 11 entered through registering holes 12 in the ears. The part 8 has a bore 13 of a sufficiently larger diameter than the smooth portion 14 of the bolt to accommodate the rollers or "needles" 15 therebetween. The rollers 15 are assembled in the bore 13, as hereinafter described, and, although keystoned in place by virtue of the interengagement of adjacent rollers with one another, are retained temporarily by the rubber ball 16 entered with a press fit in the bearing. This ball being spheroidal can, of course, be entered into the bearing promiscuously, that is to say, it is not like a cylindrical member which could be entered only one way—with the member in coaxial relation to the bearing. Furthermore, the ball being of rubber or other compressible and resilient material, compensates for slight discrepancies in bore and roller sizes, one way or the other, so as to hold the rollers in place securely, thus avoiding the objection going with the use of a temporary retainer of metal or other relatively non-compressible material which would be apt to fit loosely in one case and too tightly in another. The retainer ball 16, as clearly appears in Fig. 3, will be ejected in the insertion of the bolt 11, and can therefore be used over and over in the same plant indefinitely. These balls are furthermore inexpensive and of light weight so that in case it is desired to ship the roller-containing parts for subsequent final assembly elsewhere, the cost of the retainer balls is so low as to be insignificant, and the added weight is too little to be noticeable. The parts 8, while in the condition illustrated in Figs. 1 and 2, with the rollers retained therein by the balls, can be handled carelessly and even thrown around without any danger of the rollers becoming displaced. In passing, it will be noticed in Fig. 2 that some space is left beyond the ball at both ends of the bearing so that there will be no difficulty whatever in starting the bolt into the bearing in the final assembling operation illustrated in Fig. 3. In this operation, it will also be evident that while the ball is being ejected by the bolt, the rollers are held against endwise displacement by abutment at their ends with the inside of one of the ears 10.

Figure 4:
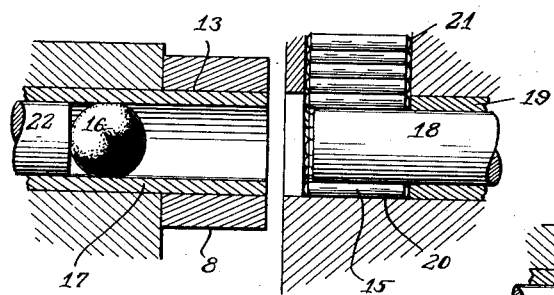
Figs. 4 to 7 are fragmentary sectional details of a roller bearing assembling machine showing the different steps in the assembling of the rollers and the temporary retainer in the bearing.
Figure 5:
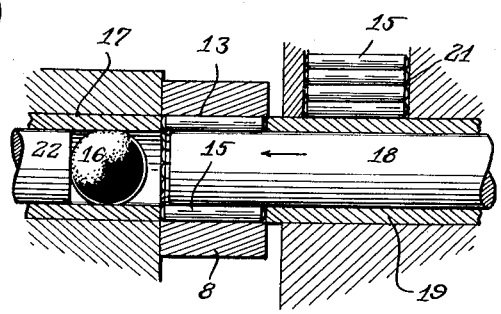
Figure 6:
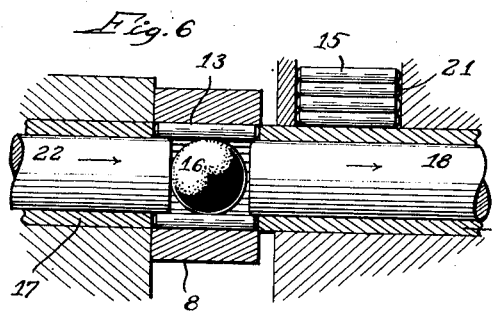
Figure 7:
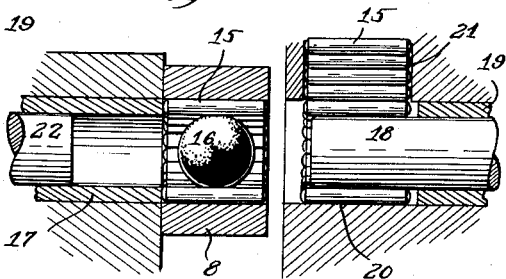

Referring now to Figs. 4 to 7, wherein I have shown the different steps in the assembling of the rollers 15 in the bearing and the entry of the temporary retainer ball 16, it will be seen in Fig. 4 that the bearing is first supported on a pilot sleeve 17 in coaxial relation with a plunger 18 and sleeve 19 for inserting the rollers 15 into the bearing 13. The rollers are first collected in the chamber 20 around the end of the plunger 18 and in front of the sleeve 19, as shown in Fig. 4, the rollers being delivered to the chamber 20 through a passage 21. Then, the plunger 18 and sleeve 19 are moved forwardly in timed relation with the withdrawal of the sleeve 17 from the bearing 13 so as to enter the rollers 15 into the bearing, as shown in Fig. 5. The ball 16 which was previously inserted into the sleeve 17 has meanwhile been held against movement with the sleeve by the plunger 22 which works inside the sleeve. The part 8, under the conditions shown in Fig. 5, is supported mainly by the end of the plunger 18, but, in the insertion of the ball 16, the plunger 18 is withdrawn, as shown in Fig. 6, in timed relation with the advancement of the plunger 22 into the bearing 13. The part 8 is, therefore, supported securely from one step to another of the assembling operation, the support being transferred first from the sleeve 17 to the plunger 18, and then from the plunger 18 to the plunger 22. Finally, after the ball 16 has been entered, the plunger 18 continues its withdrawal from the bearing to the position shown in Fig. 7, and the plunger 22 is withdrawn, as also appears in this view, leaving the past 8 free to be removed from the assembling machine. Fig. 7 also shows that the sleeve 19, at the end of the cycle, is withdrawn from the bearing to a point behind the passage 21 so as to allow rollers to enter the assembling chamber 20, preparatory for the next assembling operation.

It is clear from the foregoing that the insertion of the balls 16 into the bearings does not complicate the assembling operations to any appreciable degree, it being entirely practical to feed the balls into place one at a time in front of the plunger 22 from a hopper at the same time that rollers are being fed to the assembling chamber 20. If desired, the operator may in mounting the part 8 in the machine, insert a ball into the sleeve 17 at the same time. The mechanisms which I have devised for the performance of these operations automatically form no part of the present invention.

It is believed the foregoing description conveys a good understanding of the objects and advantages of my invention. The appended claims have been drawn with a view to covering all legitimate modifications and adaptations.

I claim:

1. As an article of manufacture, an assembly for a roller or needle bearing comprising a body having a bore provided therethrough, rollers extending lengthwise of the bore and disposed alongside and abutting one another in the bore so as to form a closed circle of rollers therein, and a spherical plug of non-metallic resilient material and normally of larger diameter than the circular space bounded by said rollers entered snugly inside said circle of rollers and serving to hold the same under yielding pressure outwardly against the wall of the bore, said plug being arranged to be subsequently expelled by a bearing member in entering the same into said bearing.

2. As an article of manufacture, an assembly for a roller or needle bearing comprising a body having a bore provided therethrough, rollers extending lengthwise of the bore and disposed alongside and abutting one another in the bore so as to form a closed circle of rollers therein, and a spherical plug of rubber and normally of larger diameter than the circular space bounded by said rollers entered snugly inside said circle of rollers and serving to hold the same under yielding pressure outwardly against the wall of the bore, said plug being arranged to be subsequently expelled by a bearing member in entering the same into said bearing.

AXEL F. REHNBERG.